(12) United States Patent
Peled et al.

(10) Patent No.: US 8,968,961 B2
(45) Date of Patent: Mar. 3, 2015

(54) METHOD OF MANUFACTURING PROTON-CONDUCTING MEMBRANES

(75) Inventors: Emanuel Peled, Even Yehuda (IL); Arnon Blum, Mobile Post Shikmim (IL); Adi Aharon, Herzelia (IL)

(73) Assignee: Ramot at Tel-Aviv University Ltd. (IL)

( * ) Notice: Subject to any disclaimer, the term of this patent is extended or adjusted under 35 U.S.C. 154(b) by 0 days.

(21) Appl. No.: 13/574,967

(22) PCT Filed: Jan. 24, 2011

(86) PCT No.: PCT/IB2011/000102
§ 371 (c)(1),
(2), (4) Date: Jul. 24, 2012

(87) PCT Pub. No.: WO2011/089521
PCT Pub. Date: Jul. 28, 2011

(65) Prior Publication Data
US 2012/0312696 A1    Dec. 13, 2012

Related U.S. Application Data

(60) Provisional application No. 61/297,853, filed on Jan. 25, 2010.

(51) Int. Cl.
*H01M 8/10*    (2006.01)

(52) U.S. Cl.
USPC .......................................... 429/492; 427/115

(58) Field of Classification Search
USPC .......................................... 429/492; 427/115
See application file for complete search history.

(56) References Cited

U.S. PATENT DOCUMENTS

| | | | |
|---|---|---|---|
| 6,447,943 B1 * | 9/2002 | Peled et al. | 429/494 |
| 6,811,911 B1 * | 11/2004 | Peled et al. | 429/499 |
| 2003/0091883 A1 * | 5/2003 | Peled et al. | 429/25 |
| 2009/0121140 A1 * | 5/2009 | Maezawa et al. | 250/361 R |
| 2010/0021793 A1 | 1/2010 | Matsuda et al. | |
| 2010/0060985 A1 * | 3/2010 | Kamada et al. | 359/492 |
| 2012/0021335 A1 * | 1/2012 | Sugioka et al. | 429/492 |

FOREIGN PATENT DOCUMENTS

WO    2005072870 A1    8/2005

OTHER PUBLICATIONS

International Preliminary Report on Patentability dated Nov. 5, 2012 for corresponding International Patent Application No. PCT/IB2011/000102.
International Search Report and Written Opinion dated Aug. 3, 2011 for corresponding International Patent Application No. PCT/IB2011/000102.
International Preliminary Report on Patentability dated Aug. 9, 2012 for corresponding International Patent Application No. PCT/IB2011/000102.
European Office Action dated Jul. 12, 2013 from corresponding European Application No. 11 714 387.5, 4 pages.
Canadian Office Action dated Nov. 22, 2013 corresponding to Canadian App. No. 2787645, 2pp.

\* cited by examiner

*Primary Examiner* — Peter D. Mulcahy
*Assistant Examiner* — Henry Hu
(74) *Attorney, Agent, or Firm* — Ohlandt, Greeley, Ruggiero & Perle, L.L.P.

(57) ABSTRACT

A process for producing proton-conducting membrane, the process comprising: mixing (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxygen and the fuel; and (iii) 10 to 90% by volume of an acid or aqueous acid solution, wherein the mixing is conducted at various rate steps, thereby producing a proton-conducting mixture; continuously casting the proton-conducting mixture on rolled paper, non-woven matrix or the like at ambient temperature; drying the casted proton-conducting mixture at a temperature of greater than 100° C. for approximately 5 to 30 minutes, thereby forming a dry film; and laminating a plurality of the dry films together under pressure, and thereafter extracting pore-former out of pores of the dry films, thereby forming the proton-conducting membrane having an average pore size of less than 30 nanometers.

18 Claims, No Drawings

METHOD OF MANUFACTURING PROTON-CONDUCTING MEMBRANES

This application claims the benefit of U.S. Provisional Application Ser. No. 61/297,853, filed on Jan. 25, 2010, and PCT/IB2011/000102, filed Jan. 24, 2011.

BACKGROUND

1. Field of the Disclosure

The present disclosure generally relates to a process for producing proton-conducting membranes (PCMs), e.g., composite polymeric films with inorganic ceramic oxides.

2. Description of Related Art

Proton-conducting membranes (PCMs) are found in many electrochemical applications, including fuel cells, electrolyzers, super-capacitors, sensors, and batteries. Nafion is the most commonly used membrane in fuel cells operating at near-room temperature (up to 100° C.). Nafion, a solid polymer electrolyte, has two major disadvantages, it is very expensive and it dries during fuel cell operation as a result of water dragging by the proton. In recent years, there has been an intensive effort to develop a low-cost solid polymer electrolyte to replace Nafion, with significant progress being made. Room-temperature, proton-conducting materials have been discussed in a few papers and patents published by Emanuel Peled, such as U.S. Pat. No. 6,447,943, U.S. Pat. No. 6,492,047. In addition, nano-porous proton-conducting membrane (NP-PCM) for electrochemical applications have been know, such as U.S. Pat. No. 6,811,911, U.S. Pat. No. 6,447,943, U.S. Pat. No. 7,413,824, and EP141045381, which are incorporated herein in their entirety.

SUMMARY

A novel, low-cost, efficient procedure to manufacture a highly conductive PCM. In one embodiment the procedure is carried out in a scaled up process. That is, the most critical challenge in fuel cell development for practical applications is to improve the economics through the use of low-cost components with acceptable life and performance.

A process for producing proton-conducting membrane, the process comprising: mixing (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxidizer and the fuel; and (iii) 10 to 90% by volume of an acid or aqueous acid solution, wherein the mixing is conducted at various rate steps, thereby producing a proton-conducting mixture; continuously casting the proton-conducting mixture on rolled paper, non-woven matrix or any other coatible material at ambient temperature; drying the casted proton-conducting mixture at a temperature of greater than 100° C. for approximately 5 to 60 minutes, thereby forming a dry film; laminating a plurality of the dry films together under pressure, and thereafter extracting pore-former out of pores of the dry films, thereby forming the proton-conducting membrane having an average pore size of less than 30 nanometers.

The novel PCM of the present disclosure comprises a nano-size ceramic powder with good acid adsorption capacity, a polymer binder, and an acid absorbed in nanosize pores. This PCM is particularly useful in regenerative fuel cell (RFC) applications.

The main components of the PCM are a polymeric binder, an inorganic nanosize powder, and an acidic solution or acid. The typical diameter of the PCM pores is about between 1.5 to 30 nm, preferably 3 nm. The pores are filled with free acid molecules, which is a major advantage for the application of energy storage system (e.g., RFC applications) that uses an acidic electrolyte.

Unlike previous discussed PCMs, the reagents (i.e., powders and solvents) in the present disclosure are mixed with additives that improve the quality of the solution and results in better mechanical and physical properties of the cast film. The solution is then cast using a mechanical coater, which is a more efficient process and more homogeneous one.

According to the unique process of the present disclosure at least 2 to 6, preferably 4, of the dry films are laminated together. The various rate steps of the mixing step comprises: mixing for between 1 to 5 hours at a mixing rate of between about 100 to 500 rpm at room temperature; mixing for between 10 to 20 hours at a mixing rate of between about 400 to 700 rpm at a temperature in the range between about 30 to 50° C.; mixing for between 10 to 20 hours at a mixing rate of between about 100 to 400 rpm at room temperature; and degassing for between 5 to 30 minutes at a temperature in the range between about 30 to 50° C. The step of continuously casting the proton-conducting mixture is performed using a coater machine for solution application over the rolled paper, non-woven matrix or the like roll to roll carrier support.

The carrier support is a siliconized paper, and the rolling speed of the carrier support is set according to the specific gravity of the proton-conducting mixture.

The dry film has a thickness between about 40 to 60 micrometers, more preferably between about 50 to 55 micrometers.

Preferably, the step of laminating the dry films is performed at the pressure in the range between about 5 to 20 kg/cm$^2$ and at a temperature in the range between about 130 to 150° C. for between about 3 to 10 minutes.

The proton-conducting membrane has an average pore size of less than 3 nm, more preferably an average pore size of less than 1.5 nm.

The process further comprising adding at least one rheology control agent prior to mixing. The rheology control agent is at least one selected from the group consisting of: SPAN80 (provide generic chemical description sorbitan monooleate, $C_{24}H_{44}O_6$), and Zonyl® FSN (provide generic chemical description $(C_2H_4O)_x(CF_2)_yC_2H_5FO$, nonionic fluorosurfactant).

The extraction step comprises: (a) immersing the proton-conducting membrane with pore-former in an ether/ethanol mixture for a period of time sufficient to remove the pore-former from the pores of the proton-conducting membrane; (b) immersing the proton-conducting membrane from step (a) in ethanol to remove any residual pore-formers and other solvents; and (c) immersing the proton-conducting membrane in water to remove the ethanol from the pores.

The ether/ethanol mixture has a ratio of between about 1:9 to 3:7. The immersing step (a) takes place for between about 1 to 5 hours. The immersing step (b) takes place for between about 1 to 5 hours.

The inorganic powder is at least one powder selected from the group consisting of: $SiO_2$, $ZrO_2$, $B_2O_3$, $TiO_2$, $Al_2O_3$, and hydroxides and oxy-hydroxides of Ti, Al, B and Zr.

The polymeric binder is at least one binder selected from the group consisting of: poly(vinilydenfluoride), poly(vinilydenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), and Kel F™, i.e. homopolymer of chlorotrifluoroethylene).

The acid is at least one selected from the group consisting of: polyfluoroolefin sulfonic acid, perfluoroolefin sulfonic acid, polyfluoroaryl sulfonic acids, perfluoroaryl sulfonic, acids where up to 50% of the hydrogen or fluorine atoms were replaced by chlorine atoms, $CF_3(CF_2)_nSO_3H$, $HO_3S(CF_2CH_2)_nSO_3H$, $CF_23(CF_2CH_2)_nSO_3H$, $HO_3S(CF_2)_nSO_3H$, where n is an integer having a value of 1 to 9, Nafion™ ionomers (i.e. perfluorosulfonic acid-PTFE copolymer), HCl, HBr, phosphoric acid, and sulfuric acid.

The polyfluoroaryl sulfonic acid is at least one selected from the group consisting of: polyfluorobenzene, polyfluorotoluene, and polyfluorostyrene sulfonic acid. The perfluoroaryl sulfonic acid is at least one selected from the group consisting of: perfluorobenzene, perfluorotoluene and perfluorostyrene sulfonic acid.

The process further comprising a pore-former selected from the group consisting of: DBP (i.e. dibutyl phthalate), diethyl phthalate, dimethylphthalate, propylene carbonate, ethylene caatbonate and the like or any combinations thereof.

The process further comprising the step of recapturing the acid or aqueous acid solution.

DETAILED DESCRIPTION OF THE PREFERRED EMBODIMENT

Electrochemical devices among which: RFCs, fuel cells, electrolyzers, batteries, electrochemical sensors and others are using various types of ion conducting membranes.

The membrane disclosed is a combination of a copolymer matrix (e.g., a polymer derived from two (or more) monomeric species, a ceramic powder (e.g., inorganic or nonmetallic materials). Most ceramics are compounds between metallic and nonmetallic elements for which the interatomic bonds are either totally ionic or predominantly ionic but having some covalent character and a compatible organic solvent plasticizer which maintains a homogenous composition in the form of a flexible, self-supporting film.

The improved, scaled-up process for PCM manufacturing includes the use of large quantities of materials, additives for better suspension formation, professional mixing equipment and an industrial coating machine, as will be described in details hereafter.

The essential chemicals in the process are inorganic powder, e.g., ceramic powder, more particularly, $SiO_2$, $ZrO_2$, $B_2O_3$, $TiO_2$, $Al_2O_3$, and hydroxides and oxy-hydroxides of Ti, Al, B and Zr, and a polymeric binder like poly-[vinylidene fluoride] (PVDF) or others, which are blended in a mixture of solvents and additives. The volume percent of the silicone-dioxide in the mixture varies between 5 to 50%, preferably 15-40%, more specific range is 20-30%. Membrane films were manufactured by the following process in several compositions within the above range. The solvent to solids ratio is smaller than 10:1, preferably 4:1 or less. See U.S. Pat. No. 6,811,911, which is incorporated herein in its entirety.

As mentioned, the solids, solvents and additives are mixed in a large volume flask (3 to 10 liters, preferably 5) with a Teflon-coated stirrer at different speed and temperature, according to the steps hereafter. The mixing steps are described as follows:

1. Pre-blending separately all liquid substances and all solids;

2. Dispersing the solids in the solvents while stirring at alternate speed and temperature for several hours; and 3. The resulting solution is now ready to cast, and can be stored at a closed vessel for few weeks.

The previous discussed technology, that uses manual coaters or semi-automatic ones (like K control coater, by RK print or similar devices), which is susceptible to variation and inconsistencies. Unlike the above methods, the casting of the film is performed in this embodiment with a coater pilot machine that uses "Doctor Knife" method, as described in U.S. Pat. No. 4,119,836 which is incorporated herein by reference in its entirety for solution application over the suitable continuous "roll to roll" support. The carrier support which is used can be a siliconized paper, woven, non-woven carbon support or any other support which the membrane can be easily pilled from, and the rolling speed of the paper in the machine is set according to the solution parameters (specific gravity, viscosity, etc.). The knife gap is adjusted to meet the desired film thickness according to the solution properties and the paper is continuously coated by the solution while rolling into the annealing oven. The temperature of the front part of the oven varies from 90 to 110° C. Total residence time in the oven is determined by the rolling speed and the film thickness.

Proton-Conducting Membranes

A preferred solid electrolyte membrane is a proton conducting membrane having pores with a diameter size which is essentially smaller than 30 nm and comprising: (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxygen and said fuel; and (iii) 10 to 90% by volume of an acid or aqueous acid solution.

The solid proton conducting membrane used in the fuel cells are described in U.S. Pat. Nos. 6,447,943 and 6,492,047, which are incorporated herein in their entirety by reference thereto. The polymeric binders used in these membranes are selected from the group consisting of: poly(vinilydenfluoride), poly(vinilydenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), Kel™ and any combinations thereof.

The inorganic nanosize powder used for preparing the solid proton conducting membrane is selected from the group consisting of $SiO_2$, $ZrO_2$, $B_2O_3$, $TiO_2$, $Al_2O_3$, hydroxides and oxy-hydroxides of Ti, Al, B and Zr, and any combinations thereof.

The proton conducting membrane used in the fuel cell of the disclosure also comprises an acid. As opposed to the solid electrolyte membrane described for example in U.S. Pat. No. 5,599,638, which is incorporated herein by reference thereto in its entirety, wherein no acid is present in free form, the solid electrolyte membrane discussed here, when used in the fuel cells, contains free acid molecules entrapped in the pores of the membrane. Alternatively, it may contain acid molecules bonded to the inorganic powder. The typical diameter of these pores is essentially smaller than 30 nm, preferably smaller than 20 nm, and more preferably smaller than 3 nm.

A large variety of low vapor pressure acids that are compatible with the cell hardware and with the catalysts at both electrodes can be used and adapted to a specific application. The following list of acids is given for example: polyfluoroolefin sulfonic acid, perfluoroolefin sulfonic acid, polyfluoroaryl sulfonic acids such as polyfluorobenzene, polyfluorotoluene, or polyfluorostyrene sulfonic acid, perfluoroaryl sulfonic acids such as perfluorobenzene, perfluorotoluene or perfluorostyrene sulfonic acid, similar acids where up to 50% of the hydrogen or fluorine atoms were replaced by chlorine atoms, $CF_3(CF_2)_nSO_3H$, $HO_3S(CF_2CH_2)_nSO_3H$, $CF_23(CF_2CH_2)_nSO_3H$, $HO_3S(CF_2)_nSO_3H$, where n is an integer having a value of 1 to 9, Nafion™ ionomers, HCl, HBr, phosphoric acid, sulfuric acid and mixtures thereof.

Alternatively, the solid electrolyte membrane is a proton conducting membrane (PCM) and it comprises pores with a typical diameter size which is essentially smaller than 50 nm, preferably smaller than 3 nm, and more preferably smaller than 1.5 nm.

A further membrane according to the present disclosure is film made of an proton conducting matrix as described in U.S. Pat. No. 6,811,911, which is incorporated herein in its entirety by reference thereto. The ion conducting matrix comprises: (i) 5% to 60% by volume of an inorganic powder having a good aqueous electrolyte absorption capacity; (ii) 5% to 50% by volume of a polymeric binder that is chemically compatible with an aqueous electrolyte; and (iii) 10 to 90% by volume of an aqueous electrolyte, wherein the inorganic powder comprises essentially sub-micron particles, preferably from about 5 to about 150 nm in size. The matrix of the present disclosure may, optionally, comprise between about 0.1% to about 25% of a non-volatile liquid lubricant that is chemically compatible with all the components in the matrix.

In accordance with a preferred embodiment of the present disclosure, the inorganic powder is characterized in that it has a surface area of at least 10 $m_2/g$, and possesses a good absorption capability for the aqueous electrolyte.

Preferably, the inorganic powder of the matrix of the present disclosure is a member selected from the group consisting of $SiO_2$, $ZrO_2$, $B_2O_3$, $TiO_2$, $Al_2O_3$ and the like.

The polymeric binder used, in the matrix of the present disclosure is a material which is chemically compatible with an aqueous electrolyte used, i.e. non-soluble in that electrolyte, and is a member selected from the group consisting of: polyvinilydene fluoride (PVDF), PVDF-hexafluoropropylene (PVDHFP), poly(tetrafluoroethylene) (PTFE), poly(m-ethylmethacrylate) (PMMA), polysulfone amide, poly(acrylamide), polyvinyl chloride (PVC), poly(acrylonitrile), polyvinyl fluoride and any combination thereof.

The acid according to the present disclosure, which may be also a mixture of acids, may be a pure acid or an acid dissolved in water or in another suitable non-aqueous solvent that is known per se in the art. Acids suitable according to the present disclosure are: $CF_23(CF_2)_nSO_3H$, $HO_3S(CF_2)_nSO_3H$, wherein n is an integer having a value of 0 to 9, sulfuric acid, HCl, HBr, phosphoric acid, $HNO_3$ and the like. Preferred acids are $CF_3(CF_2)_nSO_3H$ or $HO_3S_3S(CF_2)_nSO_3H$, where n is equal to 0, 1, 2, 3 or 4. These preferred acids can be used either in their pure form or as aqueous solutions having a molar concentration of 10 to 99%, and preferably a molar concentration of 25% to 99%.

The PCM of the present disclosure has the general appearance of a plastic film having good mechanical properties. It can typically be bent to about 180° with no substantial fractures occurring, and it can be prepared in thickness being in the range of from about 10 to about 1000 microns or more. Due to its stability and good ionic conductivity, it can be used at a large temperature range of from sub-zero to about 150° C.

According to a preferred embodiment of the disclosure, where the matrix is in the preparation of a membrane, the inorganic powder comprised in the matrix is a very fine, electronically non-conductive powder having a particle size of preferably less than 150 nm. According to this embodiment, the PCM pores in which the aqueous electrolyte is absorbed are very small, and their characteristic dimension is essentially smaller than 50 nm.

The absorption capacity or the retention capability of the membrane for the acid or the aqueous electrolyte used depends on several parameters, among which are the composition and the type of the inorganic powder, the polymeric binder and the type of the dissolved acid or electrolyte. The combination of these parameters should be optimized in order to tailor the product for each application. While carrying out such optimization, consideration should be given to the fact that the highest the content of inorganic powder is the inferior the mechanical properties become. Increasing the inorganic powder content of the matrix increases its electrolyte retention characteristic, but at the same time, decreases its mechanical strength. On the other hand, increasing the polymeric binder in the matrix increases the strength of the latter, but decreases the wettability of the matrix thus turning it to a less conductive one.

According to yet another embodiment of the disclosure, an improvement of the matrix wettability and consequently the electrolyte retention, is achieved by adding to the membrane multi valance metal salts such as Al, Zr, B, Ti and the like.

According to another embodiment of the disclosure, the improvement of the matrix wettability and consequently the electrolyte retention is achieved by pre-treating the inorganic powder with an acid or a base prior to the preparation of the membrane.

Example 1

28-12 Version, 60% Pore Volume

Mix 200 grams of PVDF and 105.6 grams of silicondioxide ("silica") of area 400 meter$^2$ per gram. In a different flask the processing solvents (241.6 gr DBP and 1320 gr DMF) and the Rheology control agents (10 gr SPAN80 and 0.6 gr Zonil) are mixed. The powders are dispersed in the solvents for 3 hours at low mixing rate (200 rpm) at room temperature. The mixing rate is increased to 500 rpm while heating to 40° C. for 16 hours. Additional 16 hour of stirring at 300 rpm at room temperature for deaeration (removing air entrapped in the mixture) following by 6 hours in a controlled temperature environment without mixing at 35° C. The solution is then transferred to the coating machine (Dixon Model 160 Mk2, as described in http://www.dixontechnologies.com/marketspilot.html) that was loaded with siliconized paper of the type NIR-LNR-0063R-01. The knife gap was set to 180 micrometer and the rolling speed was 0.5 meter per minute.

The resulting dry film is 40-60 micrometers thick, preferably 50-55 micrometers thick, and is contained with the liquid substance DBP, which serves a pore-former (is an oily material with high viscosity) and some other residual solvents. Lamination of 2-6 films together under pressure of 5-20 kg/cm$^2$ at 140-145° C. for 3-10 minutes provides a membrane with better mechanical properties. An extraction process follows the lamination in order to "drain" the pore-former out of the pores, creating a porous film with small pores, less than 30 nanometers, preferably less than 3 nm, more specific less than 1.5 nm. The extraction stage includes few steps:

Ether:Ethanol bath, contains 1:9 ratio of those solvents, the membranes are immersed in the bath for two hours to extract the DBP of the pores;

Ethanol bath, to remove the remains of DBP and other latent solvents for two hours; and Water bath (de-ionized water)—to remove the ethanol out of the pores.

Example 2

32-8 Version, 60% Pore Volume

The mixing and casting procedures are the same as described in example 1, only the quantities of the materials are changed according to the following formula: 284.8 gr of PVDF, 88 gr of silica, 311.8 gr DBP, 12.5 gr SPAN80, 1377.4 gr DMF, 0.2 gr Zonil.

Example 3

Membranes of examples 1 and 2 were tested for room temperature conductivity, after being boiled in 3M sulfuric acid for 1 hour, using Solartron 1260. The conductivity was 0.144 S/cm$^{-1}$ and 0.102 S/cm$^{-1}$ for example 1 and 2, respectively. The conductive) content, since it has good acid absorbance). Table 1 below demonstrates the conductivity of several membranes, manufactured in the past, manual, small-scale process, versus the updated automated process being used now. Overall, the up scaling process preserves the conductivity properties of the membrane within an acceptable range of 0.1-0.2 S/cm$^{-1}$.

TABLE 1 the conductivity of various hand-made and machine-made NP-PCMs

| Sample # | Process | Pore volume [%] | Ceramic powder volume [%] | Sulfuric acid concentration [M] | Conductivity at RT [S/cm] | Reference |
|---|---|---|---|---|---|---|
| 1 | Manual | 80 | 8 | 4.5 | 0.179 | |
| 2 | Manual | 75 | 10 | 4.5 | 0.21 | i |
| 3 | Manual | 60 | 16 | 3 | 0.19 | ii |
| 4 | Manual | 60 | 12 | 1.7 (Triflic acid) | 0.15 | iii, iv |
| 5 | Manual | 60 | 12 | 3 | 0.2 | v |
| 6 | Manual | 60 | 12 | 3 | 0.092 | Tested after hot press |
| 7 | Automated | 60 | 12 | 1.7 (Triflic acid) | 0.17 | iii, iv |
| 8 | Automated | 60 | 12 | 3 | 0.144 | |
| 9 | Automated | 60 | 12 | 3 | 0.102 | |
| 10 | Automated | 60 | 12 | 3 | 0.082 | Tested after hot press | i—Electrochemical and Solid-State Letters, 1(5) 210-211 (1998)
ii—Electrochemical and Solid-State Letters, 3 (12) (2000)
iii—Journal of Power Sources 161 (2006) 1187-1191
iv—Electrochemical and Solid-State Letters, 7 (12) (2004) 507
v—Electrochemical and Solid-State Letters, 6 (12) A268-A271 (2003)

Example 4

Table 2 below summarized the differences in the process for manufacturing a Proton-Conducting Member of the present disclosure vs. conventional process stews.

Most of the improvements results in saving time and labor, i.e. more efficient process with better quality of the outcome film. The reproducibility of the process is reliable and simple: the films are homogenous and stronger, and there is only minor, negligible effect on the physical properties of the membranes - within an acceptable range and statistic error, as demonstrated in table 1

| Parameter | Conventional Process Steps | Process Steps of the Present Disclosure | Advantage |
|---|---|---|---|
| Solution weight | Up to 0.5 Kg (200 ml) | ~2 Kg (5000 ml) | More efficient, time-saving production |
| Mixing procedure | Single, constant rate - rate not mentioned in previous publications | Various rate steps - 16 hours at 500 rpm, 16 hours at 300 rpm, slow mix for 6 hours | More homogenous solution, less air bubbles (slow mixing for deacration process) |
| Rheology agents | None | SMO-SPAN80 Zonyl - Surfactant | Better quality of the solution, enhanced surface tension, allows casted film finer adhesion to the coated substrate. |
| Casting substrate | Glass/plastic plate | Rolled paper | Volume production is possible, efficient utilization of the film (less boundary defects) |
| Casting environment | Ambient, still | Ambient, semi-automated onto rolled paper | More efficient, time-saving production |
| Casting device | K control print | Dixon coater, semi-automated process | More efficient, time-saving, reproducible production, efficient utilization of materials and time. |
| Drying procedure | Ambient, overnight | >100° C. oven, ~10 minutes | More efficient, time-saving production |
| Films to membrane pressing procedure | 2 * Extracted films | 4 un-extracted films | More homogenous lamination and adhesion between films, better quality of membrane, less prone to pin-holes. |
| PCM extraction | Single film; Water X2 | 4 pressed films; multiple extraction with ether/ethanol mixture bath, followed by an ethanol bath, followed by water bath | More efficient extraction of processing solvents - 4 films at a time instead of one. |

What is claimed is:

1. A scaled-up process for producing a proton-conducting membrane, said process comprising:

mixing (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxidizer and fuel; (iii) 10 to 90% by volume of an aqueous acid solution or acid, and (iv) a rheology modifier; wherein said mixing is conducted at various rate steps, thereby producing a mixture;

continuously casting said mixture over a roll to roll carrier support selected from rolled paper or a non-woven matrix, at ambient temperature;

drying said casted mixture at a temperature of greater than 100° C. for about 5 to about 60 minutes, thereby forming a dry film; and laminating from 2 to 6 of said dry films together under pressure and thereafter extracting pore-former out of pores of the dry films; wherein said laminating is performed at a pressure in the range between about 5 to 20 kg/cm$^2$ and at a temperature in the range between about 130 to 150° C. for between about 3 to 10 minutes;

wherein said proton-conducting membrane has an average pore size of less than 30 nanometers; and wherein the scaled-up process preserves the conductivity properties of the proton-conducting membrane within a range of about 0.1-0.2 S/cm$^{-1}$ in comparison with a process other than the scaled-up process.

2. The process according to claim 1, wherein from 4 to 6 of said dry films are laminated together.

3. The process according to claim 1, wherein said various rate steps of said mixing step comprises:

mixing for between 1 to 5 hours at a mixing rate of between about 100 to 500 rpm at room temperature;

mixing for between 10 to 20 hours at a mixing rate of between about 400 to 700 rpm at a temperature in the range between about 30 to 50° C.;

mixing for between 10 to 20 hours at a mixing rate of between about 100 to 400 rpm at room temperature; and degassing for between 5 to 30 hours at a temperature in the range between about 30 to 50° C.

4. The process according to claim 1, wherein said dry film has a thickness between about 40 to 60 micrometers.

5. The process according to claim 1, wherein said proton-conducting membrane has an average pore size of less than 3 nm.

6. The process according to claim 1, wherein said extraction step comprises:

(a) immersing said proton-conducting membrane with pore-former in an ether/ethanol mixture for a period of time sufficient to remove said pore-former from the pores of said proton-conducting membrane;

(b) immersing said proton-conducting membrane from step (a) in ethanol to remove any residual pore-formers and other solvents; and (c) immersing said proton-conducting membrane in water to remove said ethanol from said pores.

7. The process according to claim 6, wherein said ether/ethanol mixture has a ratio of between about 1:9 to 3:7.

8. The process according to claim 6, wherein said immersing step (a) takes place for between about 1 to 5 hours, and said immersing step (b) takes place for between about 1 to 5 hours.

9. The process according to claim 1, wherein said inorganic powder is at least one powder selected from the group consisting of: $SiO_2$, $ZrO_2$, $B_2O_3$, $TiO_2$, $Al_2O_3$, and hydroxides and oxy-hydroxides of Ti, Al, B and Zr.

10. The process according to claim 1, wherein said polymeric binder is at least one binder selected from the group consisting of: poly(vinilydenfluoride), poly(vinilydenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), and a homopolymer of chlorotrifluoroethylene.

11. The process according to claim 1, wherein said acid is at least one selected from the group consisting of: polyfluoroolefin sulfonic acid, perfluoroolefin sulfonic acid, polyfluoroaryl sulfonic acids, perfluoroaryl sulfonic, acids where up to 50% of the hydrogen or fluorine atoms were replaced by chlorine atoms, $CF_3(CF_2)_nSO_3H$, $HO_3S(CF_2CH_2)_nSO_3H$, $CF_23(CF_2CH_2)_nSO_3H$, $HO_3S(CF_2)_nSO_3H$, where n is an integer having a value of 1 to 9, perfluorosulfonic acid copolymers), HCl, HBr, phosphoric acid, and sulfuric acid; wherein said polyfluoroaryl sulfonic acids are at least one selected from the group consisting of: polyfluorobenzene, polyfluorotoluene, and polyfluorostyrene sulfonic acid.

12. The process according to claim 1, further comprising at least one pore-former selected from the group consisting of: dibutyl phthalate, diethyl phthalate, dimethylphthalate, propylene carbonate, and ethylene carbonate.

13. The process according to claim 1, wherein said rheology control agent is at least one selected from the group consisting of: sorbitan monooleate, $C_{24}H_{44}O_6$), and a nonionic fluorosurfactant $(C_2H_4O)_x(CF_2)_yC_2H_5FO$.

14. The process according to claim 1, further comprising the step of recapturing said acid or aqueous acid solution.

15. The process according to claim 1, wherein said step of continuously casting said proton-conducting mixture is performed using a coater machine for solution application over the rolled paper, non-woven matrix or the like roll to roll carrier support.

16. The process according to claim 15, wherein said carrier support is a siliconized paper, and the rolling speed of said carrier support is set according to the specific gravity of said proton-conducting mixture.

17. A proton conducting membrane formed by the process of claim 1.

18. The process according to claim 1, which is a low cost, efficient scaled-up process.

* * * * *